United States Patent [19]

Matsubara et al.

[11] Patent Number: 5,371,565
[45] Date of Patent: Dec. 6, 1994

[54] FOCAL-PLANE SHUTTER DEVICE

[75] Inventors: Takashi Matsubara, Yokohama; Masayuki Kanamuro, Kawasaki; Masanori Hasuda, Yokohama, all of Japan

[73] Assignee: Nikon Corporation, Tokyo, Japan

[21] Appl. No.: 196,789

[22] Filed: Feb. 15, 1994

Related U.S. Application Data

[63] Continuation of Ser. No. 972,642, Nov. 6, 1992, abandoned.

[30] Foreign Application Priority Data

Nov. 15, 1991 [JP] Japan .................... 3-300881
Aug. 10, 1992 [JP] Japan .................... 4-212816

[51] Int. Cl.$^5$ ............................. G03B 9/40
[52] U.S. Cl. ................... 354/246; 354/248
[58] Field of Search ............ 354/245, 246, 247, 248, 354/249

[56] References Cited

U.S. PATENT DOCUMENTS

| | | | |
|---|---|---|---|
| 1,929,626 | 10/1933 | De Forest | 352/35 |
| 2,196,358 | 4/1940 | Heinisch | 352/35 |
| 4,162,829 | 7/1979 | Cook et al. | 352/35 |
| 4,493,544 | 1/1985 | Uematsu | 354/246 |
| 4,515,469 | 5/1985 | Blaschek | 352/35 |
| 5,037,195 | 8/1991 | Clairmont et al. | 352/35 |

FOREIGN PATENT DOCUMENTS 60-140034 9/1985 Japan .

*Primary Examiner*—Monroe H. Hayes
*Attorney, Agent, or Firm*—Shapiro and Shapiro

[57] ABSTRACT

The present invention aims at improving the durability of a very high-speed shutter exceeding 1/8000 sec and further attaining a very high shutter speed even with sectors composed of a material exhibiting a low rigidity. For this purpose, a focal plane shutter device comprises: first and second blinds each constructed of a plurality of sectors; and a light shielding plate having an opening and an intermediate plate disposed between the first blind and the second blind. The first and second blinds are run in the facial direction of the light shielding plate so as to cover and expose the opening. The light shielding plate and the intermediate plate are bonded, or a shock absorbing member is interposed between these two plates.

7 Claims, 5 Drawing Sheets

FOCAL-PLANE SHUTTER DEVICE

This is a continuation of application Ser. No. 972,642 filed Nov. 6, 1992, now abandoned.

BACKGROUND OF THE INVENTION

1. Field of the Invention

The present invention relates to a focal plane shutter device including two sector groups (first and second blinds) disposed in the vicinity of an exposure window (opening: aperture) of a camera and each consisting of a plurality, viz., four or five pieces, of split sectors.

2. Related Background Art

In recent years, with increasing demands for hyperfine pictures and new expressions of pictures, it has been desired that a film sensitivity be improved, and a shutter speed of the camera be increased. Then, in response to the demand for the higher shutter speed, there was proposed a camera in which a shutter speed as high as 1/8000 sec is actually attained.

For such an increase in the shutter speed, the following construction was proposed. In a conventional focal plane shutter of such a type that an opening having a wide area is needed, a sector unit including two combined sector groups each consisting of a plurality of sectors is operated at a high speed by an electromagnetic driving source. For this purpose, the sectors composed mainly of carbon fibers are employed in place of light metals such as titanium, aluminium and beryllium.

Further, for preventing a direct impingement between the sector group having the sectors folded (superposed) and the sector group having the sectors that spread during an operation of the shutter among the plurality of sectors, these sector groups (first and second blinds) are disposed separately in front and in rear of a light shielding plate formed with an opening. The sectors are thus prevented from being damaged and vibrated. In this case, a spacing between these two sector groups is desirably widened in order to attain a smooth operation without causing a contact between those sector groups. Where the spacing between the two sector groups is simply widened, however, there exists a possibility in which the light leaks (light leakage) during the shutter operation when the sectors and the light shielding plate are largely spaced. Therefore, the first and second blinds should be disposed close to the light shielding plate at a distance close enough not to cause the light leakage. Then, an intermediate plate in addition to the light shielding plate is further interposed between the two sector groups, thus widening the spacing between the two sector groups while restraining the light leakage in the prior art. If, a thickness of the light shielding plate is increased, the spacing between the two sector groups can be similarly widened while restraining the light leakage. For the following reason, however, there is taken the arrangement that the intermediate-plate other than the light shielding plate is disposed.

In the split sectors of the respective sector groups, a quantity of vibrations increases with a larger amount of movement of the sectors. Hence, there is a possibility wherein the sectors having the large quantity of vibrations contact an edge (edge in the vertical direction) of the opening of the light shielding plate. In the case of the first blind, the sector having the largest moving quantity moves at a relatively low speed on the occasion of a release. The vibration quantity does not therefore become large enough to contact the edge of the opening. Further, the sector having the least moving quantity is disposed closest to the light shielding plate, and hence there is no such possibility as to contact the edge of the opening even when running the sector at a high speed. On the other hand, in the case of the second blind, the sector having the largest moving quantity when running the shutter at the high speed is disposed in a position close to the opening. A probability that this sector contacts the edge of the opening is high.

For avoiding this contact, it may be satisfactory that the edge is retreated from the sector by expanding the opening in the moving direction when running the sectors at the high speed. However, the opening incorporates-a function to determine a field angle. It is therefore required that the opening be expanded only on the face side, confronting the second blind, of the light shielding plate. However, it requires considerable labor and is difficult to work the light shielding plate in that way. Thus, the spacing between the first blind and the second blind is widened by providing an intermediate plate 42 having an opening 42a that is more expanded in the moving direction during high-speed running of the sectors than an opening 30a of a light shielding plate 41 in addition to this light shielding plate 41 having the opening 30a for determining the field angle as shown in FIG. 1. Then, these light shielding plate and intermediate plate are incorporated as independent members into the focal plane shutter device.

In the thus constructed focal plane shutter device also, a much higher shutter speed exceeding 1/8000 sec has been recently demanded. It is therefore necessary to further reduce a weight of the sector members to be driven.

It is not, however, easy to reduce the weight of the sector members. A combination with a rigidity required of the sectors should be considered. Namely, when decreasing a thickness of the sector for the purpose of reducing the weight, the rigidity of the sector itself declines. There appears such a phenomenon that the sectors are undulated during a run or stop of the shutter. The undulation advances in the longitudinal direction of the sectors. Besides, the light shielding plate and the intermediate plate which partition the first and second blinds are vibrated due to an impact caused when the shutter stops.

When performing the next shutter operation in this state, the sectors, the light shielding plate and the intermediate plate contact each other, resulting in damage to the sectors themselves. It is predicted that particularly the light shielding plate and the intermediate plate which undergo the impact due to the stop of the first blind are repeatedly vibrated with such a flexure as to contact the second blind. If the second blind runs before the vibrations are attenuated, the sectors of the second blind are often broken because of an interference with the light shielding plate or the intermediate plate.

For this reason, in this type of focal plane shutter device, it is highly desired that the impact caused by the stop of the first blind is not transferred to the second blind.

SUMMARY OF THE INVENTION

It is a primary object of the present invention to provide a novel focal plane shutter device capable of improving a durability of a shutter having a very high shutter speed exceeding 1/8000 sec by restraining vibrations of a light shielding plate and an intermediate plate that are caused with an operation of sectors and also attaining a very high shutter speed even with the sectors composed of a low-rigidity material.

According to one aspect of the invention, there is provided a focal plane shutter device comprising: first and second blinds each constructed of a plurality of sectors; and a light shielding plate having an opening and an intermediate plate disposed between the first blind and the second blind, the first and second blinds being run in the facial direction of the light shielding plate so as to cover and expose the opening, characterized in that the light shielding plate and the intermediate plate are bonded.

According to another aspect of the invention there is provided a focal plane shutter device comprising: first and second blinds each constructed of a plurality of sectors; and a light shielding plate having an opening and an intermediate plate disposed between the first blind and the second blind, the first and second blinds being run in the facial direction of the light shielding plate so as to cover and expose the opening, characterized in that a shock absorbing member is interposed between the light shielding plate and the intermediate plate.

When the light shielding plate and the intermediate plate are bonded, the rigidity becomes greater than when the plates are independent of each other. Especially, an effect to avoid the impingement is enhanced by bonding the light shielding plate and the intermediate plate in the vicinities of the roots of the sectors and arms of the shutter device. As a result, the vibrations caused by running of the sectors (first blind) are not largely transferred to the light shielding plate and the intermediate plate. The vibrations can be kept small. Hence, it is feasible to prevent the impingement of the sectors more surely than the case where the light shielding plate and the intermediate plate are not bonded, the impingement being derived particularly from the interference between the second blind and the light shielding plate or the intermediate plate. Running of the sectors is thereby remarkably stabilized.

On the other hand, where the shock absorbing member is disposed between the light shielding plate and the intermediate plate, this shock absorbing member immediately attenuates the vibrations of the light shielding plate and the intermediate plate that are caused by running and stopping the sectors. In consequence, the impingement of the sectors especially due to the interference between the second blind and the light shielding plate or the intermediate plate can be prevented more surely than the case where no shock absorbing member is interposed therebetween. Running of the sectors becomes remarkably stable. The rigidity is also enhanced by integrally bonding the light shielding plate, the intermediate plate and the shock absorbing member, whereby running of the sectors can be made more stable. The shock absorbing member is not necessarily entirely interposed between the light shielding plate and the intermediate plate but may be provided in some portion thereof. Further, the light shielding plate and the intermediate plate may be bonded with a shock absorptive bonding agent or the like. This bonding material may serve as a shock absorbing member. Note that the shock absorbing member is formed with an opening having a proper size so as not to shield the light used for an exposure (exposure light) that passes through the opening in the light shielding plate.

According to the present invention, it is possible to effectively restrain the vibrations caused in the light shielding plate and the intermediate plate during the operation of the shutter (running of the sectors). As a result, the durability of the shutter having a very high shutter speed exceeding 1/8000 sec is greatly improved. It is therefore possible to attain the very high shutter speed over 1/8000 sec owing to the light-weight sectors. Besides, there can be employed even the materials that were not adoptable because of a lack of rigidity when used for the very high-speed shutter having a shutter speed over 1/8000 sec.

Note that the present invention is applicable to a vibration isolator in a lens shutter device.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENTS

Embodiments of the present invention will hereafter be described with reference to the drawings.

Figure 1:
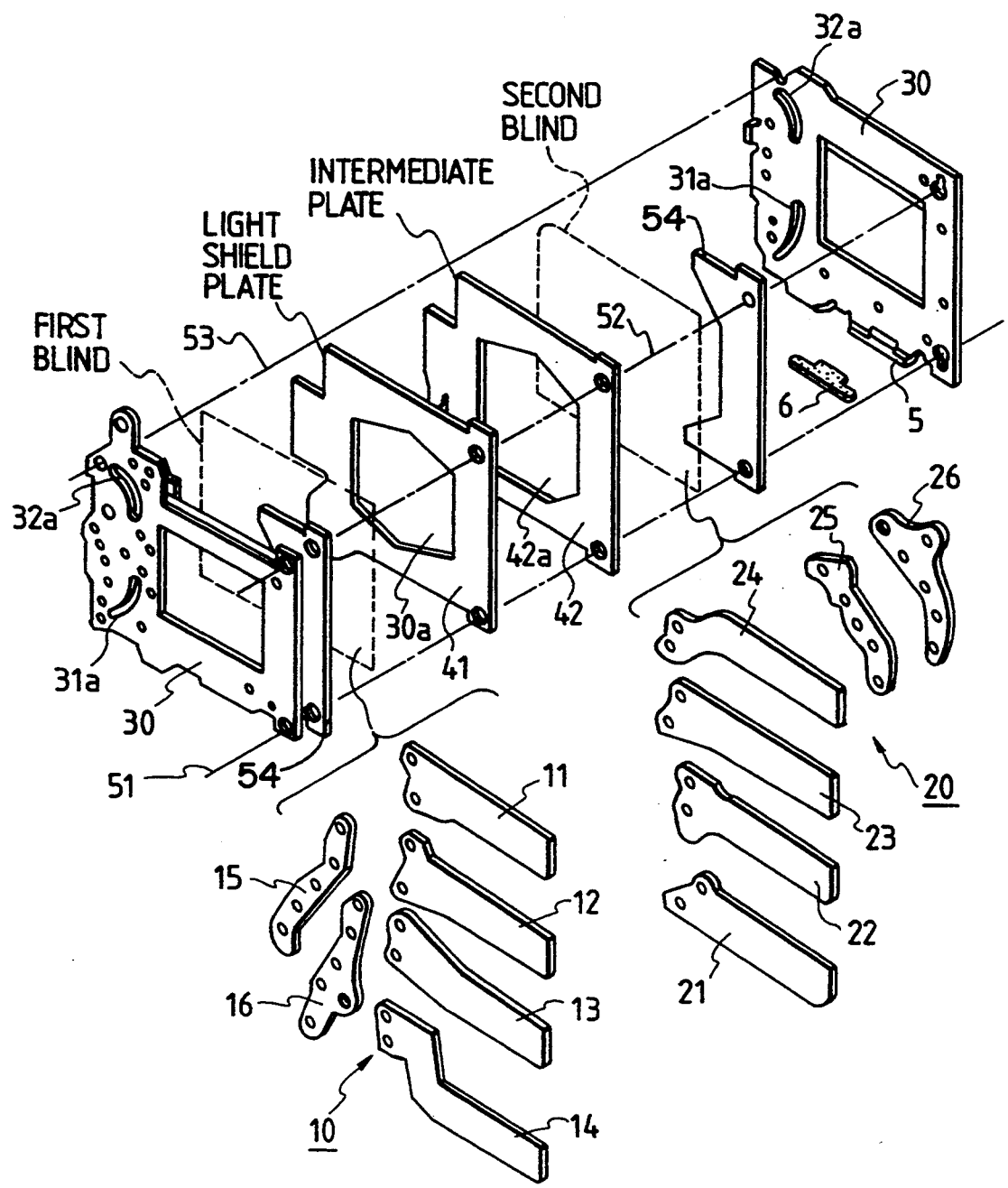
FIG. 1 is an exploded perspective view of a focal plane shutter device, showing positional relations between two sector groups (first and second blinds), a light shielding plate and an intermediate plate.

FIG. 1 is an exploded perspective view depicting the principal portion of a focal-plane shutter device. The principal parts are originally constructed to be integrated by clamping forces of mounting screws. Screw holes for this purpose are formed in the respective parts. Note that screw axes (51, 52, 53) are shown in FIG. 1. However, the integration by the clamping forces of the mounting screws results not a state where the respective components are completely fixed but a state where positions of shutter base plates 30 are fixed at constant intervals, and the respective components are so inserted and disposed between these base plates as to be movable in the axial direction of mounting pins (with backlashes provided back and forth).

In this focal plane shutter device, as illustrated in FIG. 1, a first blind group 10 is accommodated in front of a light shielding plate 41. A second blind group 20 is accommodated behind an intermediate plate 42 disposed in rear of the light shielding plate 41.

Figure 2:
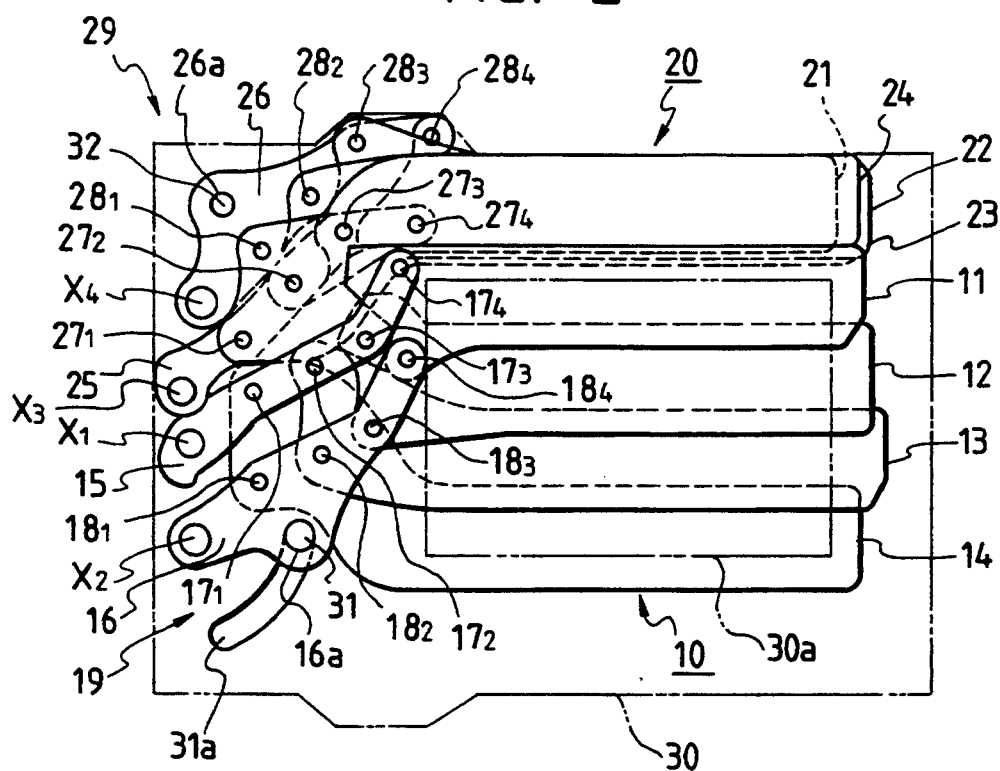
FIG. 2 is a front elevation illustrating a state where the first blind spreads to cover an exposure window (a state during a charge)

The first blind group 10 is constructed of four pieces of split sectors 11-14. The split sectors are connected through first blind arms 15, 16, whereby the sectors are superposed and spread. These first blind arms 15, 16 are, as depicted in FIG. 2, rotatably connected to arm shafts $X_1$, $X_2$ embedded in the shutter base plate 30, Then, the split sectors 11-14 are rotatably connected trough caulking pins $17_1$-$17_4$ and $18_1$-$18_4$ to the first blind arms 15, 16. A driving shaft 31 is fitted in a hole 16a of the first blind arm 16. This driving shaft 31 undergoes a driving force from a known electromagnetic shutter driving device or the like when the shutter is driven and moves inwardly of a circular arc slit 31a, thereby opening and closing the first blind group.

Figure 3:
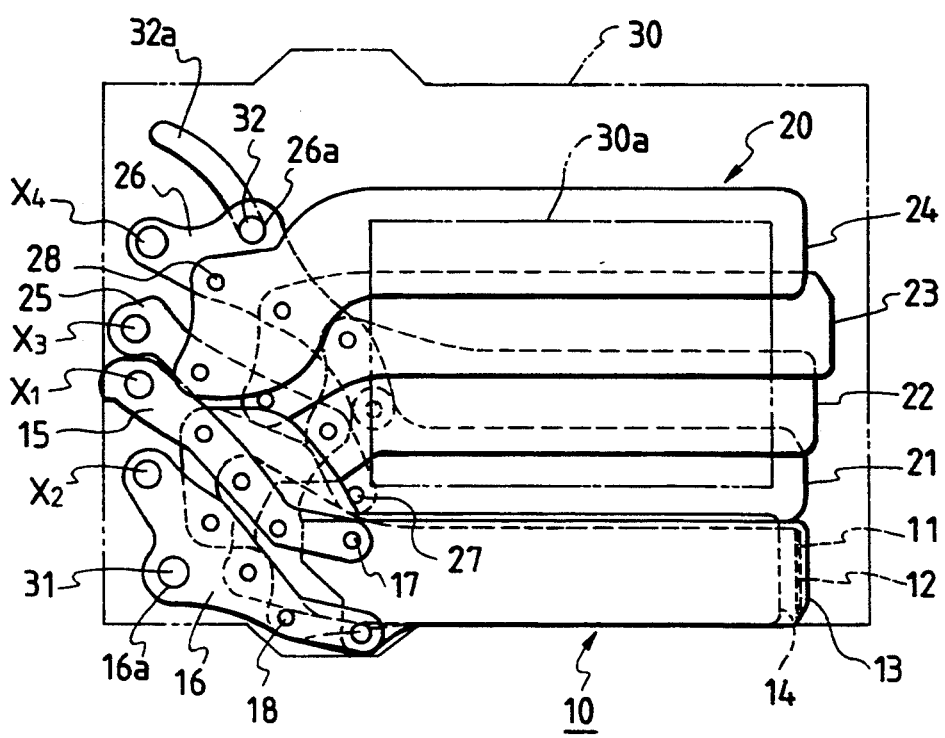
FIG. 3 is a front elevation illustrating a state where the second blind spreads to cover the exposure window (a state when a release is completed)

The second blind group 20 is also, as illustrated in FIG. 3, constructed of four pieces of split sectors 21-24. The second split sectors are rotatably connected through caulking pins $27_1$-$27_4$ and $28_1$-$28_4$ to second blind arms 25, 26 rotatably linked to arm shafts $X_3$, $X_4$ embedded in the shutter base plate 30. Further, a driving shaft 32 is fitted in a hole 26a of the second blind arm 26. This driving shaft 32 also undergoes the driving force from the known electromagnetic shutter driving device when the shutter is driven and moves inwardly of a circular arc slit 32a, thereby opening and closing the second blind group 20.

Based on this construction, when running the sectors, the driving shaft 31 depicted in FIG. 2 is moved downwards within the circular arc slit 31a in the shutter base plate by means of the above-mentioned electromagnetic shutter driving device (unillustrated). The split sectors 11-14 of the first blind group 10 that have been spread as shown in FIG. 2 through the first blind arms 15, 16 are, as illustrated in FIG. 3, superposed downwardly.

Synchronizing with the operation of this first blind group 10, the driving shaft 32 moves downwards within the circular arc slit 32a. The split sectors 21-24 of the second blind group 20 that have been overlapped as shown in FIG. 2 are, as depicted in FIG. 3, spread through the second blind arms 25, 26. During this operation, an exposure is effected via an exposure window 30a. Note that as illustrated in FIG. 1, stoppers 5 contacting the sectors when the split sectors are superposed are formed inwardly of the upper and lower portions of the front and rear shutter base plates 30 by folding the base plates themselves. A shock absorbing member 6 (shown with respect to only one shutter base plate 30 in FIG. 1) such as a rubber, etc. is attached to the contact part of this stopper 5 with the split sector. Further, sector restrainers 54 for preventing the contacts between the shutter base plates 30 and the sectors are interposed between the first blind group 10 and the shutter base plate 30 and between the second blind group 20 and the shutter base plate 30.

A shutter return is performed with a shift from a state of FIG. 3 to a state of FIG. 2.

EMBODIMENT 1

Figure 4:
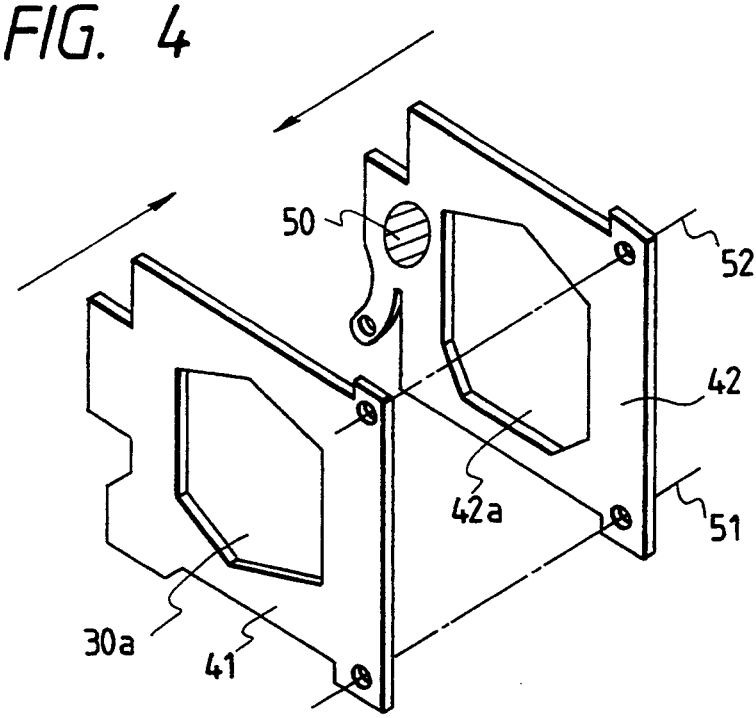
FIG. 4 is a perspective view depicting a bonding portion in the intermediate plate when bonding the light shielding plate and the intermediate plate at one location.
Figure 5:
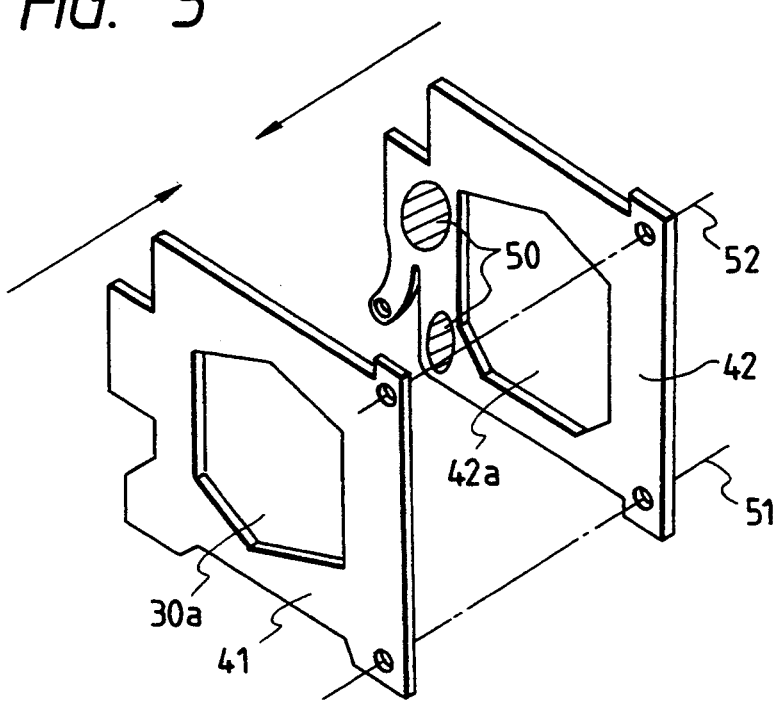
FIG. 5 is a perspective view illustrating bonding portions in the intermediate plate when bonding the light shielding plate and the intermediate plate at two locations.

According to a first embodiment of the present invention, at least some portions of the light shielding plate 41 and the intermediate plate 42 are bonded, such as at or within portions of regions 50, as illustrated in FIGS. 4 and 5. FIG. 4 illustrates a case where the two plates are bonded at one location. FIG. 5 shows a case where the two plates are bonded at two locations.

A bonding method may involve the use of a bonding agent or spot welding. Usable bonding agents may include a cyanoacrylate system, an epoxy system and a denaturalized acrylate system. It is, however, desirable that a thickness of the bonding agent after being hardened is 100 $\mu$m or under (preferably, 20–30 $\mu$m or under). If the thickness of the hardened bonding agent (layer) is too large, a resistance during the shutter operation increases. This unfavorably causes an increment in charge energy.

The bonding locations are set preferably to portions which allow fastening of the mounting screws (screw axes are indicated by 51, 52) and portions in the vicinities of roots of the sectors opposite thereto because of increasing an effect to restrain vibrations with a greater rigidity. Further, there is no problem if the entire surfaces of the light shielding plate 41 and the intermediate plate 42 are bonded.

Embodiment 2

Figure 6:
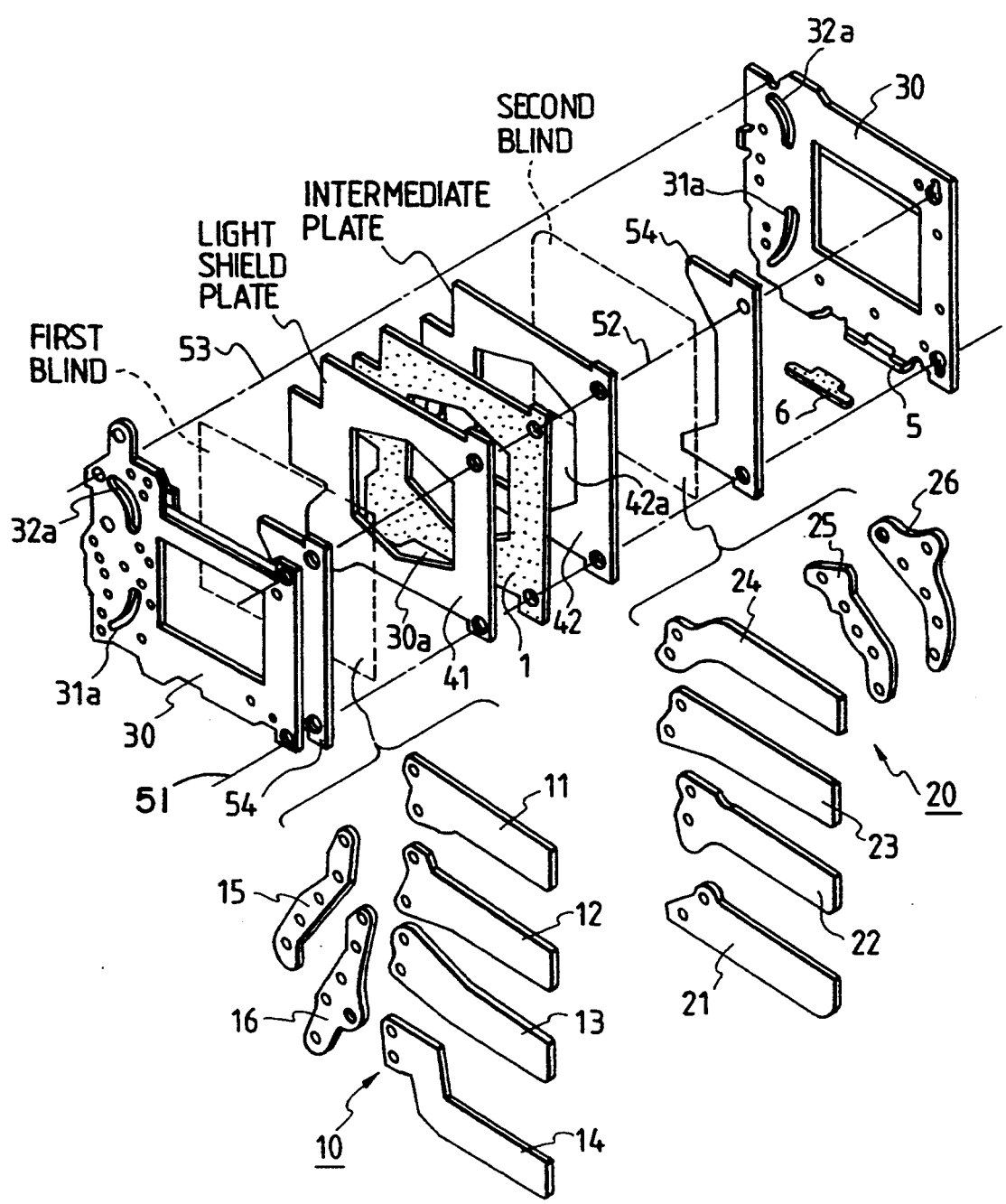
FIG. 6 is an exploded perspective view of the focal plane shutter device, showing positional relations between the two sector groups (first and second blinds), the light shielding plate, the intermediate plate and a shock absorbing member.
Figure 7:
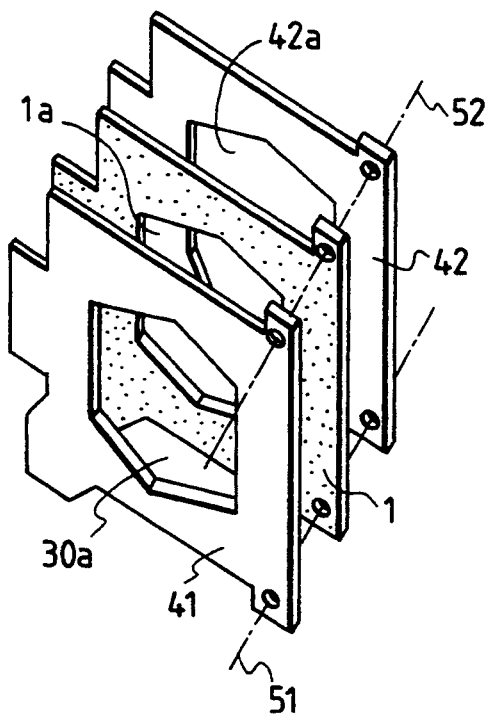
FIG. 7 is a perspective view illustrating an embodiment where the shock absorbing member is interposed between the light shielding plate and the intermediate plate.

In accordance with a second embodiment, as depicted in FIG. 6, a shock absorbing member 1 is interposed between the light shielding plate 41 and the intermediate plate 42. This shock absorbing member 1 is, as illustrated in FIG. 7, formed to assume substantially the same external configuration (outline) as those of the light shield plate 41 and the intermediate plate 42. The shock absorbing member is entirely interposed between the light shielding plate 41 and the intermediate plate 42. Further, the shock absorbing member 1 is formed with an opening 1a having a proper size so as not to shield the light for an exposure (exposure light) that passes through the opening 30a of the light shielding plate 41.

The three members—i.e., the shock absorbing member 1, the light shielding plate 41 and the intermediate plate 42—may be integrated by only the clamping force of the above-mentioned mounting screws (screw axes are indicated by 51, 52) or integrated by bonding with the bonding agent.

Embodiment 3

Figure 8:
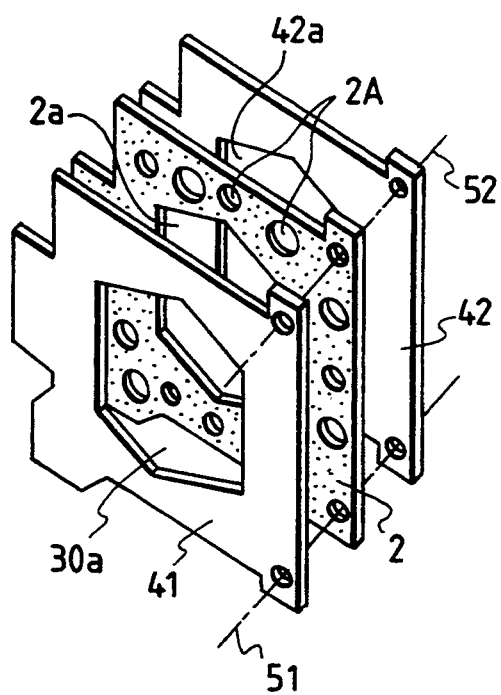
FIG. 8 is a perspective view illustrating an embodiment where a perforated shock absorbing member is interposed between the light shielding plate and the intermediate plate.

In an embodiment shown in FIG. 8, as in the same way with the embodiment (embodiment 2) of FIG. 7, a shock absorbing member 2 assuming almost the same external configuration (outline) as those of the light shielding plate 41 and the intermediate plate 42 is entirely interposed therebetween. The shock absorbing member 2 is formed with an opening 2a having a proper size so as not to shield the light for the exposure (exposure light) that passes through the opening 30a of the light shielding plate 41. Further, this shock absorbing member 2 is formed with a multiplicity of large and small holes 2A. The number of these holes 2A is adequately set, whereby an appropriate attenuation characteristic of the shock absorbing member one can be selected depending on a material of the sector. In this embodiment also, the shock absorbing member 2 is interposed between the light shielding plate 41 and the intermediate plate 42. These three members may be integrated by only the clamping force of the above-described mounting screws (screw axes are indicated by 51, 52) or integrated with the bonding agent.

Embodiment 4

Figure 9:
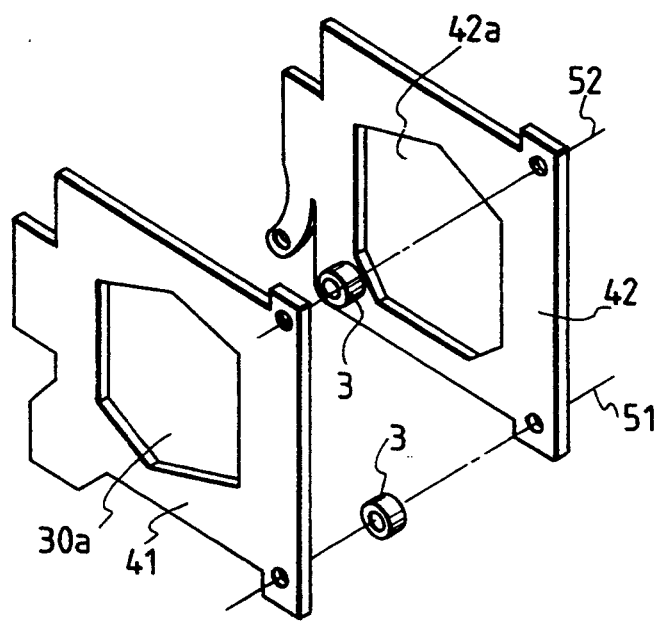
FIG. 9 is a perspective view depicting an embodiment where shock absorbing members consisting of rubber washers are interposed between the light shielding plate and the intermediate plate.

In accordance with an embodiment of FIG. 9, when integrating the light shielding plate 41 and the intermediate plate 42 through the mounting screws (screw axes are indicated by 51, 52), rubber washers 3 serving as shock absorbing members are sandwiched in between the light shielding plate 41 and the intermediate plate 42. In this embodiment also, the rubber washers 3 may be bonded to the light shielding plate 41 and the intermediate plate 42 with the bonding agent.

Embodiment 5

Figure 10:
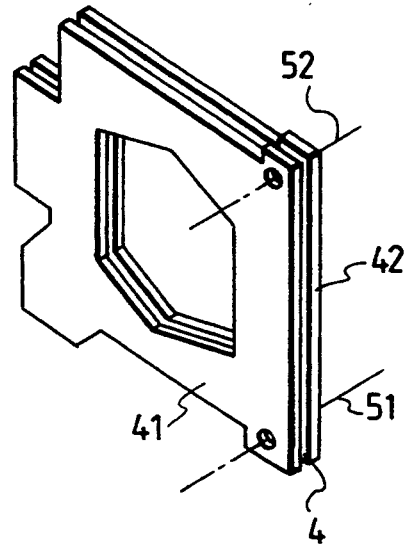
FIG. 10 is a perspective view showing an embodiment where the light shielding plate and the intermediate plate are bonded with a bonding agent serving as a shock absorbing member.

In an embodiment shown in FIG. 10, the light shielding plate 41 and the intermediate plate 42 are directly joined by use of a shock absorptive bonding agent. In this embodiment, this bonding agent functions as a shock absorbing member 4. In the examples given in the embodiments 1-4 discussed above, there is no concern of whether the bonding agent has a shock absorptive property or not. The bonding agent employed in this embodiment is, however, required to have the shock absorptive property.

Note that the shock absorbing members employed in the embodiments 2 through 5 may be made from any materials exhibiting the effect to attenuate vibrations such as silicon gel, silicon rubber, silicon resin, vinyl chloride resin, polyurethane resin, non-repulsion rubber resin, bonding agents, etc.

Further, thin film-like shock absorbing members may be attached to surfaces confronting the respective sectors in the light shielding plate 41 and the intermediate plate 42 as the necessity arises.

When running the focal plane shutter device according to the present invention discussed above at a blind speed of 2.5 msec, no abnormality (damages or the like to the sectors) could be seen even after 150000 cycles of running. In contrast with this, the abnormalities were seen in the conventional focal plane shutter device after 5000 to 20000 cycles of running.

Although the illustrative embodiments of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A focal plane shutter device having a shutter speed capability exceeding 1/8000 second and comprising:
   first and second blinds each constructed with a plurality of sectors; and
   a light shielding plate having an opening which determines a field angle and an intermediate plate having an opening of greater dimension than said field angle determining opening, said light shielding plate and said intermediate plate being disposed between said first blind and said second blind, said first and second blinds being run in the facial direction of said light shielding plate so as to cover and expose said opening thereof,
   characterized in that said light shielding plate and said intermediate plate are bonded to one another.

2. A focal plane shutter device having a shutter speed capability exceeding 1/8000 second and comprising:
   first and second blinds each constructed with a plurality of sectors; and
   a light shielding plate having an opening which determines a field angle and an intermediate plate having an opening of greater dimension than said field angle determining opening, said light shielding plate and said intermediate plate being disposed between said first blind and said second blind, said first and second blinds being run in the facial direction of said light shielding plate so as to cover and expose said opening thereof,
   characterized in that a shock absorbing member is interposed between said light shielding plate and said intermediate plate.

3. The focal plane shutter device claimed in claim 2, wherein said shock absorbing member is composed of a bonding agent bonding said light shielding plate and said intermediate plate.

4. The focal plane shutter device claimed in claim 2, wherein said shock absorbing member is bonded to said light shielding plate and said intermediate plate.

5. The focal plane shutter device claimed in claim 2, wherein said shock absorbing member has a plurality of holes, the number of which is selected to provide a predetermined attenuation characteristic.

6. The focal plane shutter device claimed in claim 2, wherein said shock absorbing member is formed to have substantially the same outline as said light shielding plate and said intermediate plate.

7. The focal plane shutter device claimed in claim 2, wherein said light shielding plate and said intermediate plate are fixed with screws, and including a plurality of shock absorbing members between said light shielding plate and said intermediate plate, said shock absorbing members being constituted by washers through which said screws pass.

* * * * *